US008643638B2

(12) United States Patent
Bae et al.

(10) Patent No.: US 8,643,638 B2
(45) Date of Patent: Feb. 4, 2014

(54) MULTIPLE MODE DRIVING CIRCUIT AND DISPLAY DEVICE INCLUDING THE SAME

(75) Inventors: Jong-Kon Bae, Seoul (KR); Hae-Woon Park, Seoul (KR); Min-Hwa Jang, Yongin-si (KR); Han-Min Cho, Seoul (KR); Young-Bae Moon, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 541 days.

(21) Appl. No.: 12/654,339

(22) Filed: Dec. 17, 2009

(65) Prior Publication Data

US 2010/0171737 A1 Jul. 8, 2010

(30) Foreign Application Priority Data

Jan. 7, 2009 (KR) ........................ 10-2009-0001148

(51) Int. Cl.
*G06F 3/038* (2013.01)
*G09G 5/00* (2006.01)

(52) U.S. Cl.
USPC ........................................... 345/213; 345/100

(58) Field of Classification Search
USPC ................................................. 345/100, 213
See application file for complete search history.

(56) References Cited

U.S. PATENT DOCUMENTS

| | | | | |
|---|---|---|---|---|
| 7,990,357 | B2 * | 8/2011 | Shin | 345/99 |
| 2003/0085859 | A1 * | 5/2003 | Lee | 345/87 |
| 2007/0097057 | A1 * | 5/2007 | Shin | 345/98 |
| 2007/0290981 | A1 * | 12/2007 | Park et al. | 345/100 |
| 2008/0048709 | A1 * | 2/2008 | Lee et al. | 324/770 |
| 2008/0291339 | A1 * | 11/2008 | Mamba et al. | 348/739 |
| 2009/0146934 | A1 * | 6/2009 | Hong et al. | 345/87 |
| 2009/0273557 | A1 * | 11/2009 | Song et al. | 345/100 |

FOREIGN PATENT DOCUMENTS

| | | |
|---|---|---|
| JP | 05-265045 | 10/1993 |
| KR | 10-2004-0107672 | 12/2004 |
| KR | 10-2007-0120269 | 12/2007 |

* cited by examiner

*Primary Examiner* — Kwang-Su Yang
(74) *Attorney, Agent, or Firm* — Harness, Dickey & Pierce, P.L.C.

(57) ABSTRACT

The display device includes a driving circuit and a panel. The driving circuit is configured to generate a source output enable signal having at least one pulse during one horizontal scanning period in response to a mode signal and configured to generate a source driving signal by latching an image data in response to the source output enable signal. The driving circuit is further configured to generate an internal horizontal synchronization signal in response to the source output enable signal and configured to generate a gate driving signal in response to the internal horizontal synchronization signal. The panel is configured to display the image data in response to the gate driving signal and the source driving signal.

20 Claims, 8 Drawing Sheets

1000

MULTIPLE MODE DRIVING CIRCUIT AND DISPLAY DEVICE INCLUDING THE SAME

CROSS-REFERENCE TO RELATED APPLICATIONS

This application claims priority under 35 USC §119 to Korean Patent Application No. 2009-0001148, filed on Jan. 7, 2009 in the Korean Intellectual Property Office (KIPO), the contents of which are herein incorporated by reference in their entirety.

BACKGROUND

1. Technical Field

Example embodiments relate to a display device, for example, to a driving circuit of the display device.

2. Description of the Related Art

Recently, liquid crystal display (LCD) devices have been widely used because LCD devices are thinner and lighter-weight than cathode ray tube (CRT) display devices and because the quality of LCD devices is generally better than that of CRT display devices.

An active-matrix LCD device includes a plurality of active elements respectively connected to a plurality of pixel electrodes arranged in a matrix. The contrast ratio of the active-matrix LCD device is higher than the contrast ratio of the simple-matrix LCD device. Therefore, most color LCD devices adopt an active-matrix type. Thin film transistor (TFT) is widely used as the active element connected to the pixel electrode of the active-matrix LCD device.

A driving circuit which drives a liquid crystal panel of the LCD device may be constituted to operate in a cascade mode or in a dual gate mode. In the cascade mode, a source driving circuit includes at least two source driving integrated circuits (ICs) that are arranged in the upper side or in the lower side of the liquid crystal panel, and a gate driving circuit includes one gate driving IC that is arranged in the left side or in the right side of the liquid crystal panel. In the dual gate mode, a gate driving circuit includes at least two gate driving ICs that are arranged in the left side or in the right side of the liquid crystal panel, and a source driving circuit includes one source driving IC that is arranged in the upper side or in the lower side of the liquid crystal panel. A conventional LCD device requires a data register having a distinct structure depending on the cascade mode or the dual gate mode, respectively, for generating source driving signals corresponding to the same number of channels. For example, in the dual gate mode, the conventional source driving circuit drives source driving signals twice during one horizontal scanning period using a multiplexer for generating the same number of the source driving signals as the number of the source driving signals generated in the cascade mode including two source driving ICs. Therefore, for operating the conventional LCD device in the dual gate mode, the size of a layout on a chip for a multiplexer and a routing circuit increases. Therefore, the chip size of the driving circuit of the conventional LCD device also increases.

SUMMARY

Example embodiments are directed to provide a driving circuit including a source driving IC capable of operating both in the cascade mode and in the dual gate mode.

Example embodiments are directed to provide a display device including the driving circuit.

According to example embodiments, a display device includes a driving circuit and a panel. The driving circuit is configured to generate a source output enable signal having at least one pulse during one horizontal scanning period in response to a mode signal and configured to generate a source driving signal by latching an image data in response to the source output enable signal. The driving circuit is further configured to generate an internal horizontal synchronization signal in response to the source output enable signal and configured to generate a gate driving signal in response to the internal horizontal synchronization signal. The panel is configured to display the image data in response to the gate driving signal and the source driving signal.

In example embodiments, the driving circuit is configured to drive the panel in one of a cascade mode and a dual gate mode based on the mode signal.

In example embodiments, the driving circuit further includes a plurality of source driving circuits, where one of the plurality of source driving circuits is configured to operate as a master and a remainder of the plurality of source driving circuits are configured to operate as a slave when the display device operates in the cascade mode.

In example embodiments, the driving circuit is configured to generate at least two gate driving signals during the one horizontal scanning period when the display device operates in the dual gate mode.

In example embodiments, the driving circuit is configured to generate the source output enable signal to have two or more pulses during the one horizontal scanning period when the display device operates in the dual gate mode.

In example embodiments, the driving circuit further includes a control circuit, a source driving circuit, and a gate driving circuit. The control circuit is configured to generate a first image data by processing the image data, configured to generate the source output enable signal to have at least one pulse during one horizontal scanning period in response to the mode signal, and configured to generate the internal horizontal synchronization signal in response to the source output enable signal. The source driving circuit is configured to generate the source driving signal based on a grayscale voltage, the first image data and the source output enable signal. The gate driving circuit is configured to generate the gate driving signal based on the internal horizontal synchronization signal.

In example embodiments, the control circuit is disposed in the source driving circuit.

In example embodiments, the source driving circuit includes a shift register, a data register, and a data latch circuit. The shift register is configured to generate a sampling signal by shifting a source sampling clock signal. The data register is configured to generate the first image data in synchronization with a first clock signal. The data latch circuit is configured to sample and latch the first image data in response to the sampling signal and configured to output the first image data when the source output enable signal is activated.

In example embodiments, the source driving circuit further includes a digital-to-analogy converter and an output buffer. The digital-to-analog converter is configured to generate an analog signal corresponding to the first image data received from the data latch circuit using the grayscale voltage. The output buffer is configured to generate the source driving signal by buffering the analog signal.

In example embodiments, the driving circuit further includes a grayscale voltage generating circuit configured to generate the grayscale voltages related to a brightness of the panel.

According to example embodiments, a driving circuit of a display device includes a control circuit, one or more source driving circuits, and a gate driving circuit. The control circuit is configured to generate a first image data by processing an input image data, configured to generate a source output enable signal having at least one pulse during one horizontal scanning period in response to a mode signal, and configured to generate an internal horizontal synchronization signal in response to the source output enable signal. The one or more source driving circuits are configured to generate a source driving signal based on a grayscale voltage, the first image data and the source output enable signal. The gate driving circuit is configured to generate a gate driving signal based on the internal horizontal synchronization signal.

BRIEF DESCRIPTION OF THE DRAWINGS

Example embodiments will become more fully understood from the detailed description given herein below and the accompanying drawings in which.

DETAILED DESCRIPTION

Figure 1:
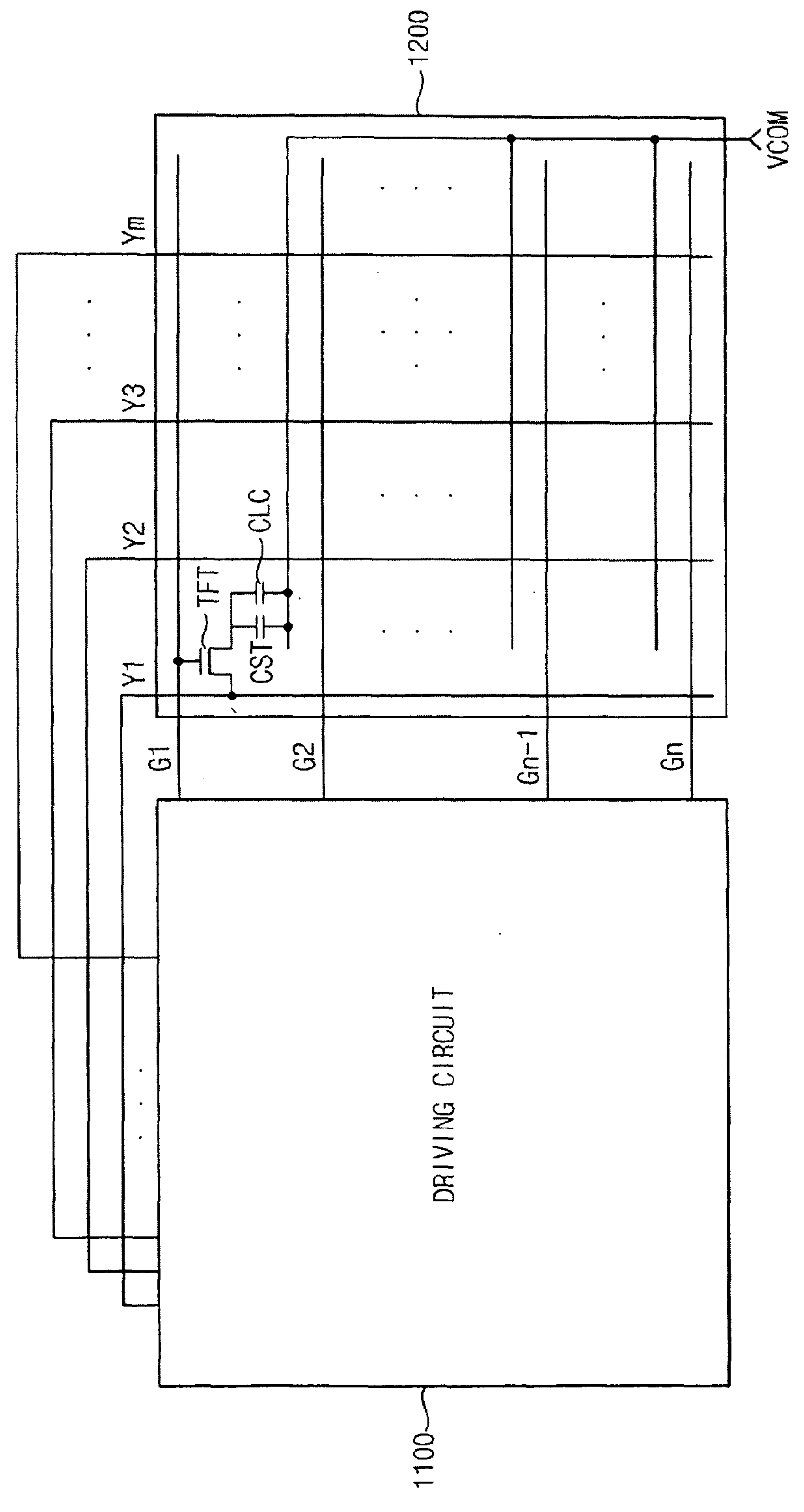
FIG. 1 is a circuit diagram illustrating a liquid crystal display (LCD) device according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a liquid crystal display (LCD) device according to example embodiments.

Referring to FIG. 1, an LCD device 1000 may include a driving circuit 1100 and a liquid crystal panel 1200.

The driving circuit 1100 generates a source output enable signal (not shown) having at least one pulse during one horizontal scanning period, and generates source driving signals Y1-Ym by latching image data in response to the source output enable signal. In addition, the driving circuit 1100 generates an internal horizontal synchronization signal (not shown) in response to the source output enable signal, and generates gate driving signals G1-Gn in response to the internal horizontal synchronization signal. The liquid crystal panel 1200 displays the image data in response to the source driving signals Y1-Ym and the gate driving signals G1-Gn.

The liquid crystal panel 1200 may include a thin film transistor (TFT) at each intersection of a matrix. A source of the TFT may receive the source driving signal (e.g., data signal), and a gate of the TFT may receive the gate driving signal (e.g., scanning signal). A storage capacitor CST and a liquid crystal capacitor CLC may be coupled between a drain of the TFT and a common voltage VCOM. The liquid crystal panel 1200 may receive the gate driving signals G1-Gn through gate lines and the source driving signals Y1-Ym through source lines.

Figure 2:
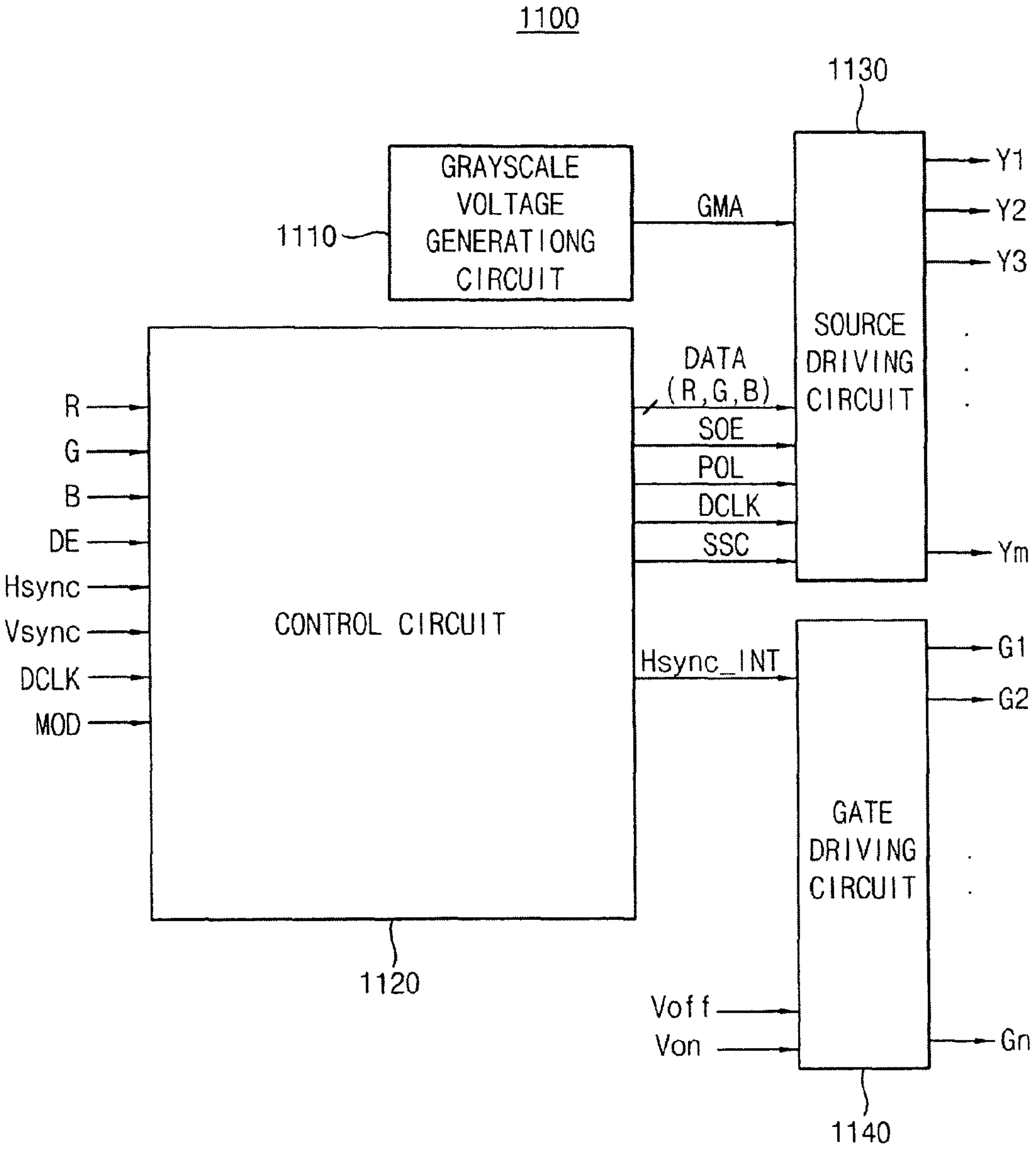
FIG. 2 is a block diagram illustrating a driving circuit included in the LCD device of FIG. 1.

FIG. 2 is a block diagram illustrating the driving circuit 1100 included in the LCD device 1000 of FIG. 1.

Referring to FIG. 2, the driving circuit 1100 may include a grayscale voltage generating circuit 1110, a control circuit 1120, a source driving circuit 1130 and a gate driving circuit 1140.

The grayscale voltage generating circuit 1110 generates positive and negative grayscale voltages GMA related with a brightness of the LCD device. The source driving circuit 1130 applies the source driving signals Y1-Ym to the source lines arranged on the liquid crystal panel 1200, and the gate driving circuit 1140 applies the gate driving signals G1-Gn to the gate lines arranged on the liquid crystal panel 1200.

The control circuit 1120 receives image data R, G, B, a data enable signal DE, a mode signal MOD, a horizontal synchronization signal Hsync, a vertical synchronization signal Vsync and a clock signal DCLK. The control circuit 1120 may generate a first image data DATA (R, G, B), the source output enable signal SOE, a polarity inversion signal POL, the clock signal DCLK and a source sampling clock signal SSC, based on the image data R, G, B, the data enable signal DE, the mode signal MOD, the horizontal synchronization signal Hsync, the vertical synchronization signal Vsync and the clock signal DCLK. The mode signal may indicate whether the driving circuit 1100 drives the panel 1200 in a cascade mode or in a dual gate mode. For example, a logic low level of the mode signal MOD may indicate the cascade mode and a logic high level of the mode signal MOD may indicate the dual gate mode. The control circuit 1120 may generate, depending on the mode signal MOD, the source output enable signal SOE having at least one pulse during one horizontal scanning period, and generate the internal horizontal synchronization signal Hsync_INT in response to the source output enable signal SOE.

The source driving circuit 1130 may generate the source driving signals Y1-Ym based on the grayscale voltages GMA, the first image data DATA(R, G, B) and the source output enable signal SOE. The gate driving circuit 1140 may generate the gate driving signals G1-Gn based on the internal horizontal synchronization signal Hsync_INT, an off-voltage Voff and an on-voltage Von.

Figure 3:
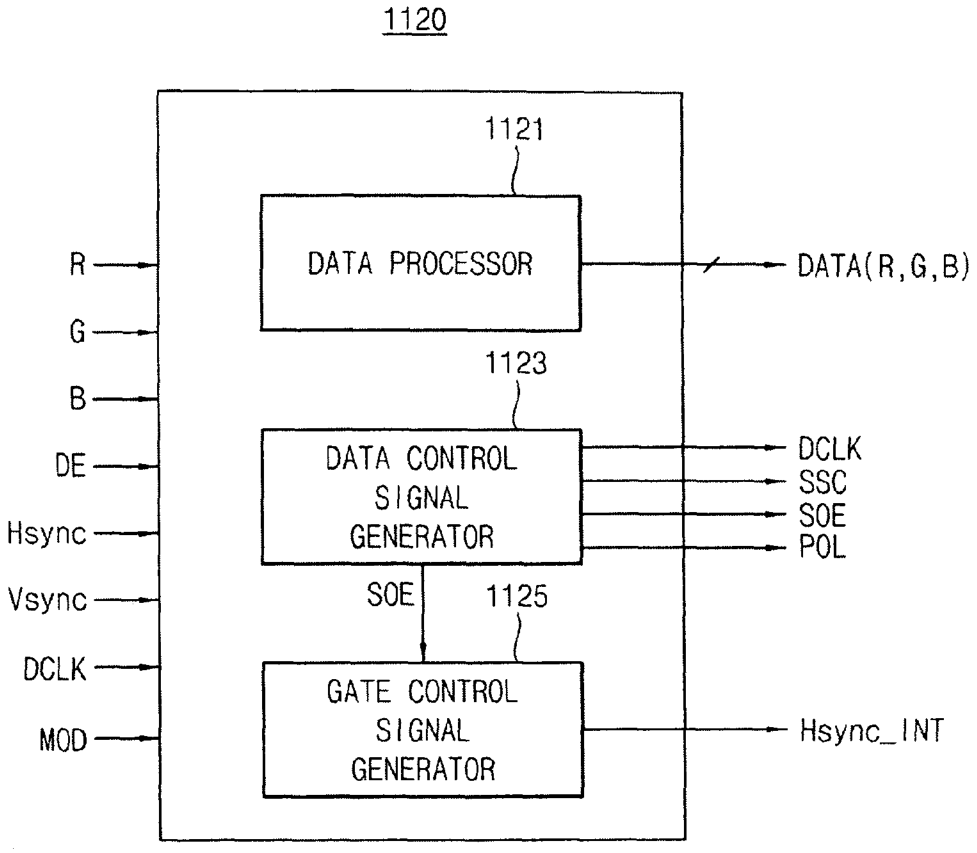
FIG. 3 is a block diagram illustrating a control circuit included in the driving circuit of FIG. 2.

FIG. 3 is a block diagram illustrating the control circuit 1120 included in the driving circuit 1100 of FIG. 2.

Referring to FIG. 3, the control circuit 1120 may include a data processor 1121, a data control signal generator 1123 and a gate control signal generator 1125.

The data processor 1121 may generate the first image data DATA(R, G, B) by processing the image data R, G, B in accordance with the operation of the liquid crystal panel 1200. The data control signal generator 1123 may generate the source output enable signal SOE, the polarity inversion signal POL, the clock signal DCLK and the source sampling clock signal SSC based on the image data R, G, B, the data enable signal DE, the mode signal MOD, the horizontal synchronization signal Hsync, the vertical synchronization signal Vsync and the clock signal DCLK. The gate control signal generator 1125 may generate the internal horizontal synchronization signal Hsync_INT for driving a gate in response to the source output enable signal SOE.

Figure 4:
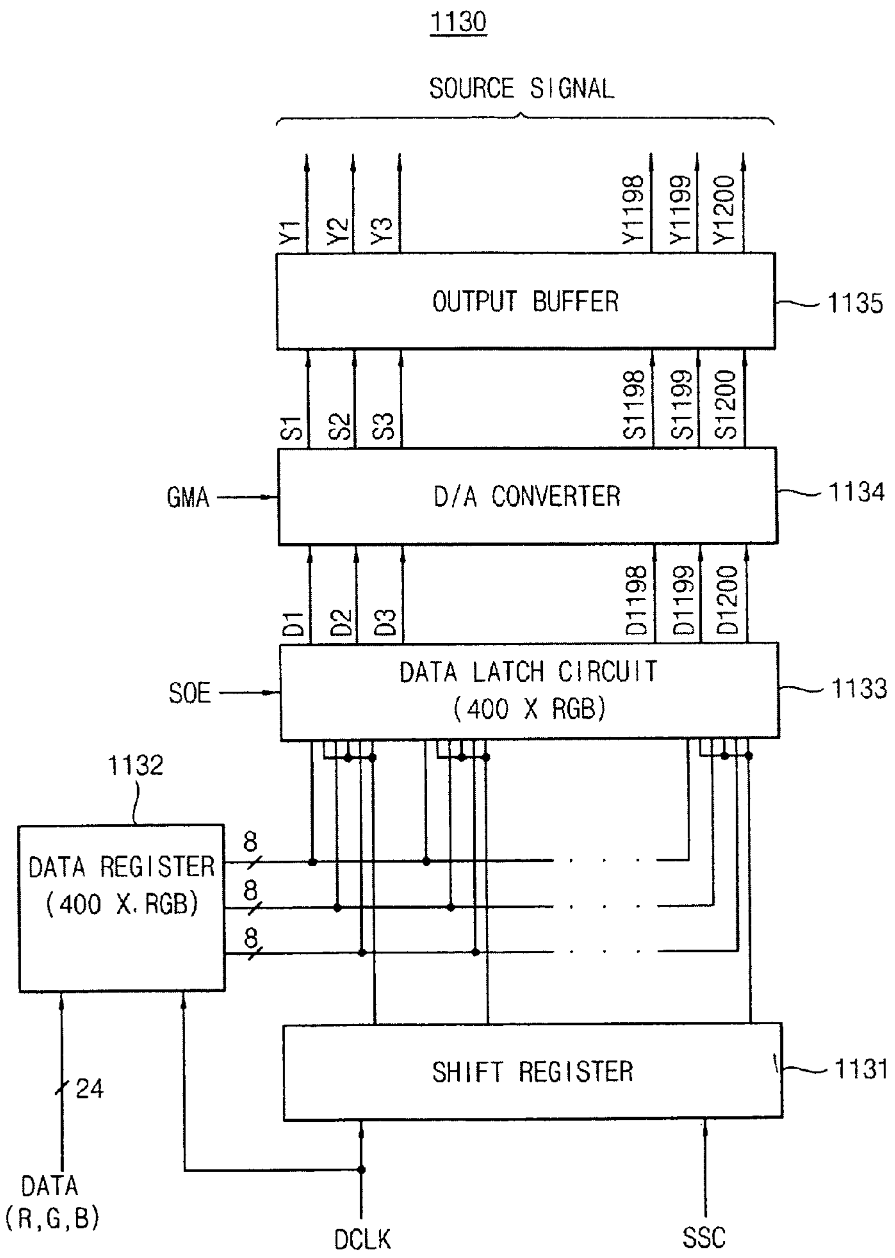
FIG. 4 is a block diagram illustrating a source driving circuit included in the driving circuit of FIG. 2.

FIG. 4 is a block diagram illustrating the source driving circuit 1130 included in the driving circuit 1100 of FIG. 2.

Referring to FIG. 4, the source driving circuit 1130 may include a shift register 1131, a data register 1132, a data latch circuit 1133, a digital-to-analog (D/A) converter 1134 and an output buffer 1135.

The shift register 1131 may generate a sampling signal by shifting the source sampling clock signal SSC in synchronization with the clock signal DCLK. The data register 1132 may output the first image data DATA(R, G, B) in synchronization with the clock signal DCLK. The data latch circuit 1133 may receive the first image data DATA(R, G, B) and the sampling signal. The data latch circuit 1133 may sample and latch the first image data DATA(R, G, B) in response to the sampling signal, and output the first image data DATA(R, G, B) when the source output enable signal SOE is activated. The D/A converter 1134 may generate analog signals S1-S1200 corresponding to output signals D1-D1200 of the data latch circuit 1133 using the grayscale voltages GMA. The output buffer 1135 may generate the source driving signals Y1-Ym by buffering the analog signals S1-S1200. The source driving signals Y1-Ym may be output to each of the source lines, respectively, in accordance with the order of the first image data DATA(R, G, B) transmitted to the data latch circuit 1133.

Figure 5:
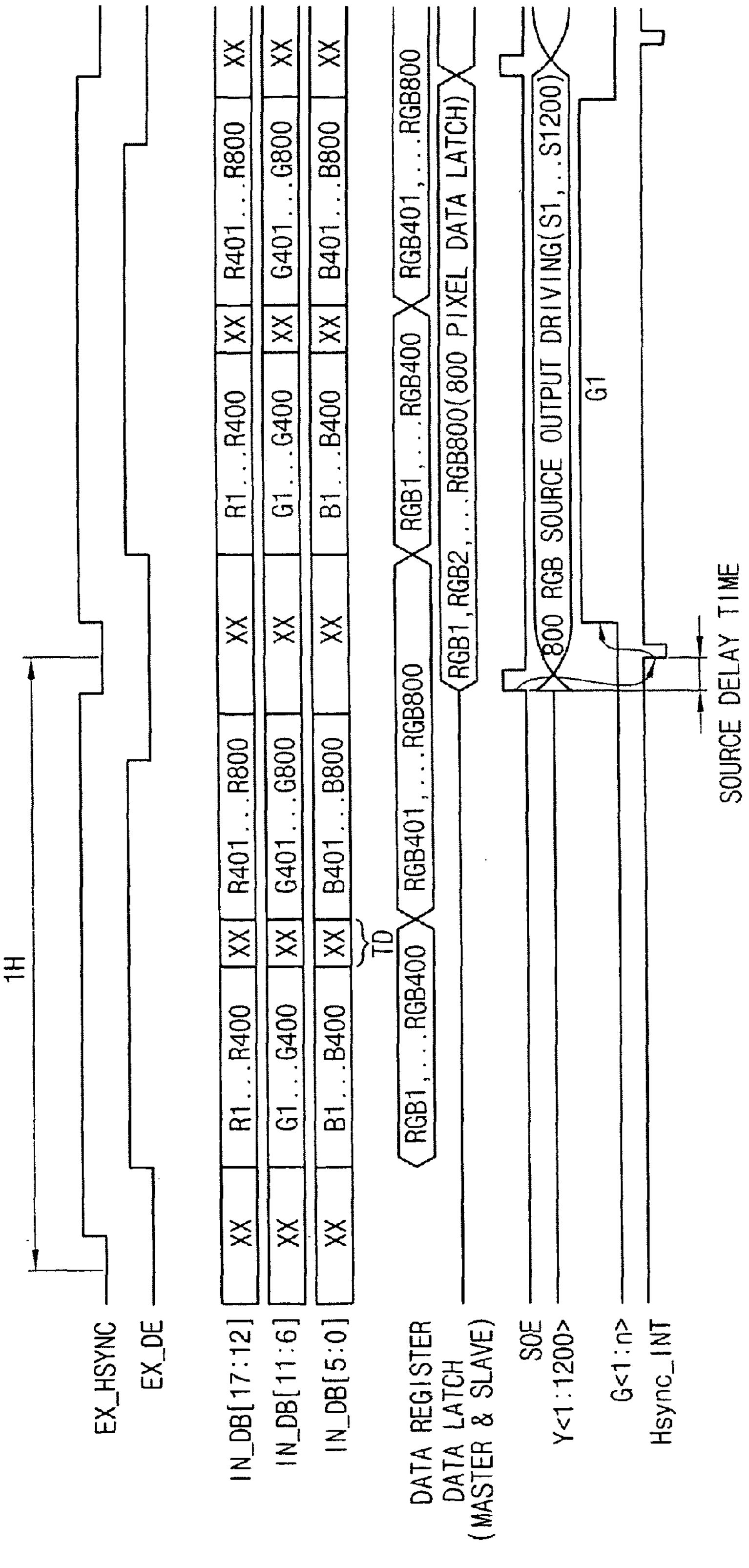
FIG. 5 is a timing diagram illustrating the operation of the driving circuit of FIG. 2 when the LCD device operates in a cascade mode.

FIG. 5 is a timing diagram illustrating the operation of the driving circuit 1100 of FIG. 2 when the LCD device 1000 operates in a cascade mode.

As will be described below with reference to FIG. 7 and FIG. 8, the driving circuit 1100 may drive the liquid crystal panel 1200 using one gate driving integrated circuit (IC) and at least two source driving ICs in the cascade mode. As illustrated in FIG. 8, when the control circuit 1522, 1532, being called as a timing controller, is arranged inside the source driving IC, one of the source driving ICs may operate as a master and the rest of the source driving ICs may operate as a slave.

In FIG. 5, EX_HSYNC may illustrate the horizontal synchronization signal Hsync transmitted to the control circuit 1120 of the driving circuit 1100 of FIG. 2 from outside, and EX_DE may illustrate the data enable signal DE transmitted to the control circuit 1120 from outside. IN_DB[5:0], IN_DB[11:6] and IN_DB[17:12] may illustrate data stored in registers included in the data processor 1121 of the control circuit 1120 of FIG. 3. DATA REGISTER may illustrate data stored in the data register 1132 of the source driving circuit 1130 of FIG. 4, and DATA LATCH may illustrate data stored in the data latch circuit 1133. SOE may illustrate the source output enable signal SOE. When the source output enable signal SOE is activated in a positive pulse form, the latch circuit 1133 may output the first image data DATA(R, G, B) stored in the latch circuit 1133. Y<1:1200> may illustrate the source driving signals Y1-Ym output from the output buffer 1135 of the source driving circuit 1130 of FIG. 4. G<1:n> may illustrate the gate driving signals G1-Gn output from the gate driving circuit 1140 of the driving circuit 1100 of FIG. 2. Hsync_INT may illustrate the internal horizontal synchronization signal generated from the control circuit 1120.

Figure 6:
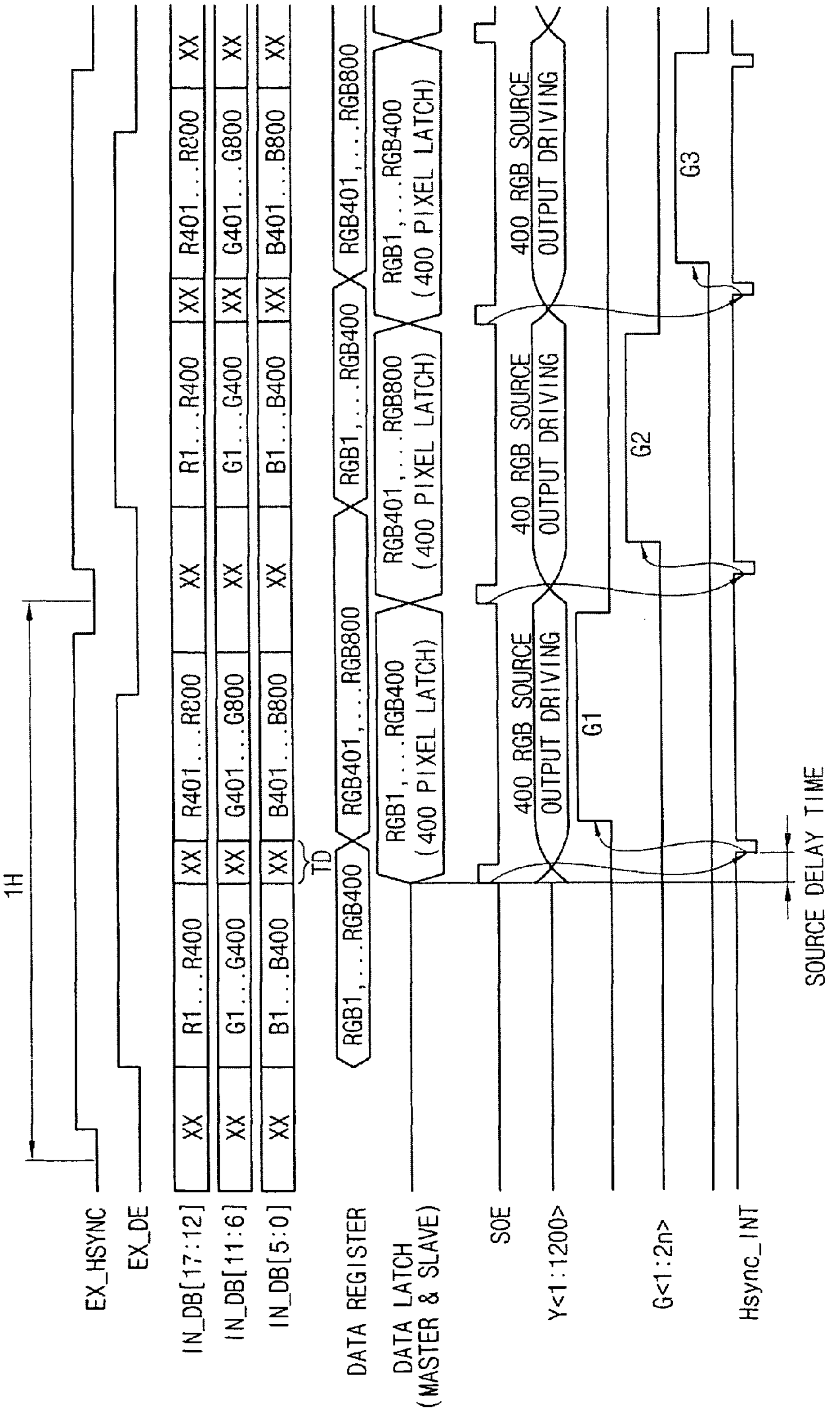
FIG. 6 is a timing diagram illustrating the operation of the driving circuit of FIG. 2 when the LCD device operates in a dual gate mode.

FIG. 6 is a timing diagram illustrating the operation of the driving circuit 1100 of FIG. 2 when the LCD device 1000 operates in a dual gate mode.

As will be described below with reference to FIG. 9 and FIG. 10, the driving circuit 1100 may drive the liquid crystal panel 1200 using one source driving IC and at least two gate driving ICs in the dual gate mode. In FIG. 6, G<1:2n> may illustrate the gate driving signals G1-Gn output from the gate driving circuit 1140 of the driving circuit 1100 of FIG. 2. When the LCD device 1000 operates in the dual gate mode (i.e., the LCD device 1000 is driven by one source driving IC and two gate driving ICs), two gate driving signals G1, G2 may be generated during one horizontal scanning period 1H for generating 2400 source driving signals 800RGB.

Hereinafter, the operation of the LCD device 1000 according to example embodiments will be described with reference to FIGS. 1 to 6.

As illustrated in FIG. 5 and FIG. 6, the driving circuit 1100 of the LCD device 1000 may generate the source output enable signal SOE having at least one pulse during one horizontal scanning period 1H depending on the operation mode, and generate the source driving signals Y1-Ym by latching the first image data DATA(R, G, B) in response to the source output enable signal SOE. The driving circuit 1100 of the LCD device 1000 may generate the internal horizontal synchronization signal Hsync_INT in response to the source output enable signal SOE, and generate the gate driving signals G1-Gn in response to the internal horizontal synchronization signal Hsync_INT. The liquid crystal panel 1200 may display the first image data DATA(R, G, B) in response to the gate driving signals G1-Gn and the source driving signals Y1-Ym.

FIG. 5 illustrates the operation of the driving circuit 1100 of FIG. 2 when the LCD device 1000 operates in the cascade mode, and FIG. 6 illustrates the operation of the driving circuit 1100 of FIG. 2 when the LCD device 1000 operates in the dual gate mode. FIG. 5 and FIG. 6 are timing diagrams illustrating the operation of the LCD device 1000 in which one source driving IC drives 1200 channels.

When the control circuit 1522 and 1532 is arranged inside the source driving IC of the LCD device 1000 and the LCD device 1000 operates in the cascade mode, as illustrated in FIG. 8, the operation of the driving circuit 1100 is as follows.

One of the two source driving ICs may operate as a master IC and the other source driving IC may operate as a slave IC. Referring to FIG. 5, 1200 image data RGB1-RGB400 may be stored in the data register 1132 of the master IC, and 1200 image data RGB401-RGB800 may be stored in the data register 1132 of the slave IC. The 1200 image data RGB1-RGB400 stored in the data register 1132 of the master IC and the 1200 image data RGB401-RGB800 stored in the data register 1132 of the slave IC may be transmitted to the data latch circuit 1133 of the master IC and to the data latch circuit 1133 of the slave IC, respectively. The data latch circuit 1133 of the master IC and the data latch circuit 1133 of the slave IC may latch the 1200 image data RGB1-RGB400 and the 1200 image data RGB401-RGB800, respectively, and output the 1200 image data RGB1-RGB400 and the 1200 image data RGB401-RGB800, respectively, when the source output enable signal SOE is activated in a positive pulse form. As illustrated in FIG. 5, when the LCD device 1000 operates in the cascade mode, the source output enable signal SOE may have one pulse during one horizontal scanning period 1H.

The internal horizontal synchronization signal Hsync_INT may be generated in response to the source output enable signal SOE, and the gate driving signals G<1:n> may be generated in response to the internal horizontal synchronization signal Hsync_INT. The source output enable signal SOE may be generated based on the external horizontal synchronization signal EX_HSYNC. As illustrated in FIG. 5, the internal horizontal synchronization signal Hsync_INT may be delayed by a source delay time with respect to the source output enable signal SOE. When the internal horizontal synchronization signal Hsync_INT is activated in a negative pulse form, the gate driving circuit 1140 of the driving circuit 1100 generates the gate driving signals G1 in response to the internal horizontal synchronization signal Hsync_INT.

When the LCD device 1000 operates in the cascade mode, one source driving IC may generate 1200 image data Y1-Y1200 in response to the gate driving signal G1. Each of the master IC and the slave IC may generate 1200 image data Y1-Y1200 simultaneously in response to the source output enable signal SOE. Therefore, 2400 image data may be generated in total.

Figure 10:
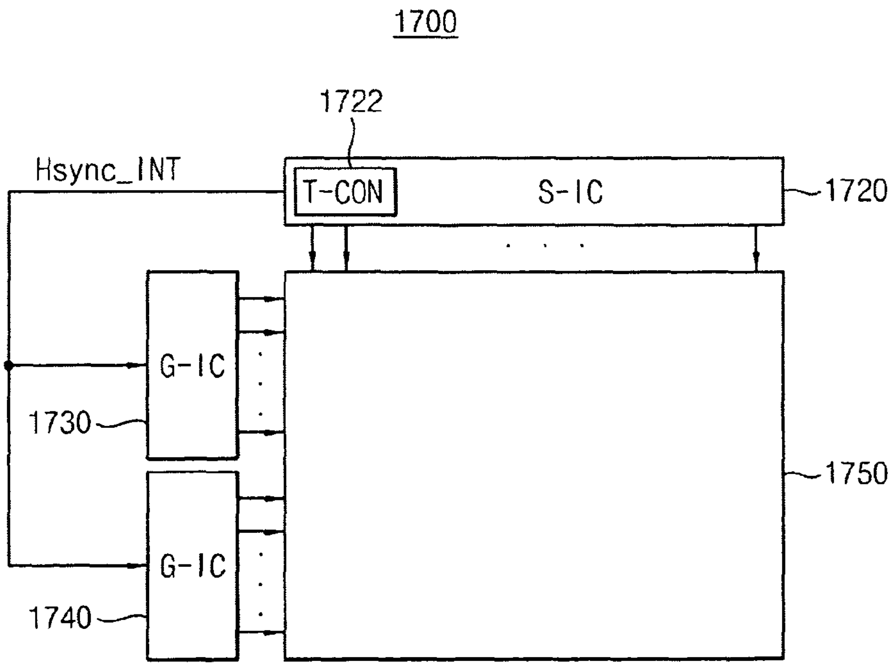

When the control circuit 1722 is arranged inside the source driving IC of the LCD device 1000 and the LCD device 1000 operates in the dual gate mode, as illustrated in FIG. 10, the operation of the driving circuit 1100 is as follows.

The driving circuit 1100 may generate the source output enable signal SOE having two pulses during one horizontal scanning period 1H, since the LCD device 1000 includes only one source driving IC in the dual gate mode, and generate the source driving signals by latching the first image data DATA (R, G, B) in response to the source output enable signal SOE. Referring to FIG. 6, the internal horizontal synchronization signal Hsync_INT may be generated in response to the source output enable signal SOE, and the gate driving signals G<1:2n> may be generated in response to the internal horizontal synchronization signal Hsync_INT. Two gate driving signals G1, G2 may be generated during one horizontal scanning period 1H since the source output enable signal SOE has two pulses during one horizontal scanning period 1H.

Since the LCD device 1000 includes only one source driving IC in the dual gate mode, the driving circuit 1100 may generate 1200 image data RGB1-RGB400 in response to a first pulse of the source output enable signal SOE and the gate driving signal G1 at first, and then generate 1200 image data RGB401-RGB800 in response to a second pulse of the source output enable signal SOE and the gate driving signal G2.

As illustrated in FIG. 6, when the LCD device 1000 operates in the dual gate mode, the source output enable signal SOE may have two pulses during one horizontal scanning period 1H. In FIG. 6, the internal horizontal synchronization signal Hsync_INT may be delayed by a source delay time with respect to the source output enable signal SOE.

When the LCD device 1000 operates in the dual gate mode, the source driving IC may generate 1200 image data RGB1-RGB400 in response to the gate driving signal G1, and generate 1200 image data RGB401-RGB800 in response to the gate driving signal G2.

When the LCD device 1000 operates in the dual gate mode (e.g., the LCD device 1000 is driven by one source driving IC and two gate driving ICs), the driving circuit 1100 may generate 2400 source driving signals 800RGB by generating two gate driving signals G1, G2 during one horizontal scanning period 1H.

FIG. 7 to FIG. 10 are block diagrams illustrating the LCD device using a source driving IC and a gate driving IC.

Figure 7:
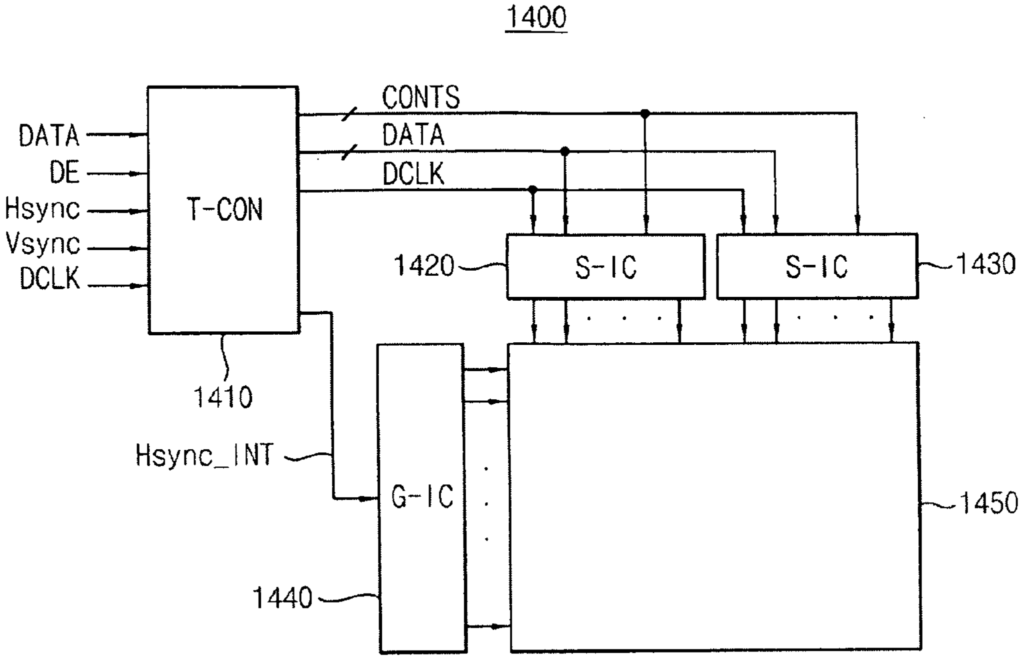
FIG. 7 and FIG. 8 are block diagrams illustrating an LCD device operating in the cascade mode.
Figure 8:
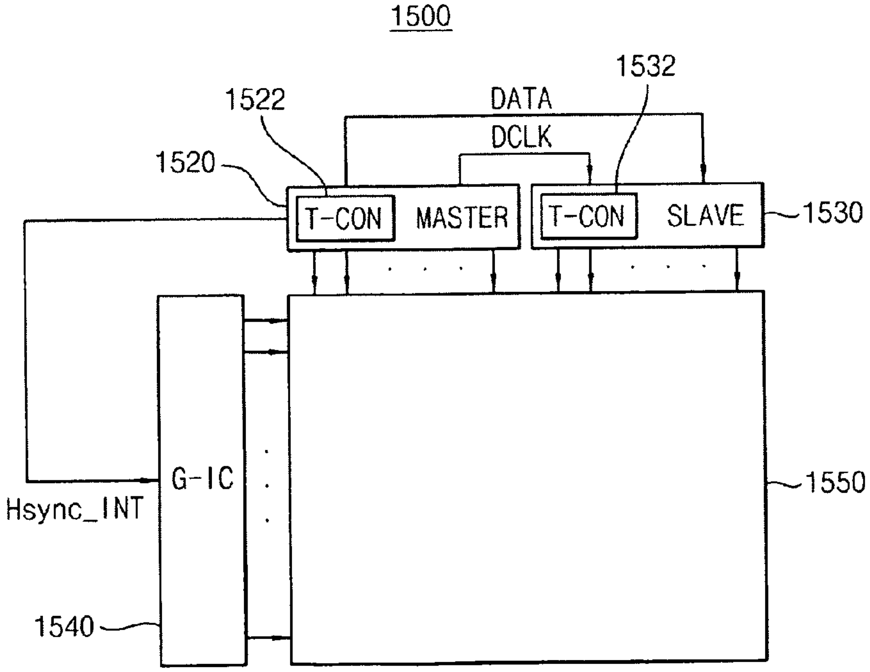
Figure 9:
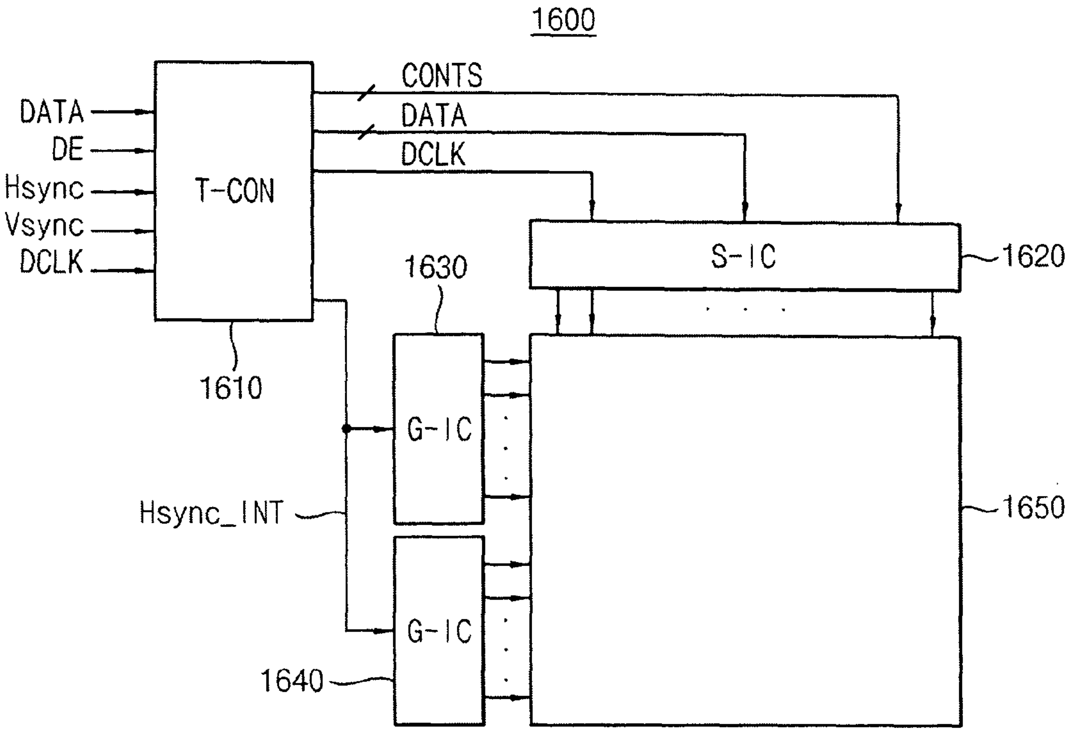
FIG. 9 and FIG. 10 are block diagrams illustrating an LCD device operating in the dual gate mode.

FIG. 7 and FIG. 8 illustrate the LCD device when the LCD device operates in the cascade mode, and FIG. 9 and FIG. 10 illustrate the LCD device when the LCD device operates in the dual gate mode. FIG. 7 and FIG. 9 illustrate the LCD device in which the control circuit is disposed out of the source driving IC, and FIG. 8 and FIG. 10 illustrate the LCD device in which the control circuit is disposed in the source driving IC.

Referring to FIG. 7, the LCD device 1400 may include a control circuit 1410, source driving ICs 1420, 1430, a gate driving IC 1440 and a liquid crystal panel 1450.

The control circuit 1410 may generate control signals CONTS by processing image data DATA in accordance with an operation of the liquid crystal panel 1450 based on the image data DATA, the data enable signal DE, the horizontal synchronization signal Hsync, the vertical synchronization signal Vsync and the clock signal DCLK. The control circuit 1410 may generate the source output enable signal SOE having at least one pulse during one horizontal scanning period, and generate the internal horizontal synchronization signal Hsync_INT in response to the source output enable signal SOE.

The source driving ICs 1420, 1430 may generate the source driving signals based on the image data DATA, the clock signal DCLK, the control signals CONTS and the grayscale voltages GMA (not illustrated), and provide the source lines of the liquid crystal panel 1450 with the source driving signals. The gate driving IC 1440 may generate the gate driving signals in response to the internal horizontal synchronization signal Hsync_INT, and provide the gate lines of the liquid crystal panel 1450 with the gate driving signals.

Referring to FIG. 8, the LCD device 1500 may include source driving ICs 1520, 1530, a gate driving IC 1540 and a liquid crystal panel 1550. A first source driving IC 1520 may include a control circuit 1522, and a second source driving IC 1530 may include a control circuit 1532.

In the LCD device 1500 of FIG. 8, the first source driving IC 1520 may illustrates a master source driving IC, and the second source driving IC 1530 may illustrates a slave source driving IC. For example, the first source driving IC 1520 including the control circuit 1522 may provide the second source driving IC 1530 with the image data DATA and the clock signal DCLK, and provide the gate driving IC 1540 with the internal horizontal synchronization signal Hsync_INT.

Referring to FIG. 9, the LCD device 1600 may include a control circuit 1610, a source driving IC 1620, gate driving ICs 1630, 1640 and a liquid crystal panel 1650.

The control circuit 1610 may generate the control signals CONTS by processing the image data DATA in accordance with an operation of the liquid crystal panel 1650 based on the image data DATA, the data enable signal DE, the horizontal synchronization signal Hsync, the vertical synchronization signal Vsync and the clock signal DCLK. The control circuit 1610 may generate the source output enable signal SOE having at least one pulse during one horizontal scanning period, and generate the internal horizontal synchronization signal Hsync_INT in response to the source output enable signal SOE.

The source driving IC 1620 may generate the source driving signals based on the image data DATA, the clock signal DCLK, the control signals CONTS and the grayscale voltages GMA (not illustrated), and provide the source lines of the liquid crystal panel 1650 with the source driving signals. The gate driving ICs 1630, 1640 may generate the gate driving signals in response to the internal horizontal synchronization signal Hsync_INT, and provide the gate lines of the liquid crystal panel 1650 with the gate driving signals.

Referring to FIG. 10, the LCD device 1700 may include a source driving IC 1720, gate driving ICs 1730, 1740 and a liquid crystal panel 1750. The source driving IC 1720 may include a control circuit 1722.

In the LCD device 1700 of FIG. 10, the source driving IC 1720 including the control circuit 1722 may provide the first gate driving IC 1730 and the second gate driving IC 1740 with the internal horizontal synchronization signal Hsync_INT.

The LCD device according to example embodiments of the present inventive concept may generate the internal horizontal synchronization signal Hsync_INT in response to the source output enable signal SOE, and generate the gate driving signals G1-Gn in response to the internal horizontal synchronization signal Hsync_INT. The driving circuit may generate the source output enable signal SOE having one pulse during one horizontal scanning period 1H in the cascade mode, and generate the source output enable signal SOE having at least two pulses during one horizontal scanning period 1H in the dual gate mode. Therefore, the LCD device according to example embodiments of the present inventive concept may be operated both in the cascade mode and in the dual gate mode using the source driving IC of the same structure.

For example, in the cascade mode in which the LCD device is driven by one gate driving IC and two source driving ICs, since each of the two source driving ICs may generate the source driving signals corresponding to 1200 image data in response to the gate driving signals, the source driving signals corresponding to 2400 image data may be generated by the two source driving ICs. In the dual gate mode in which the LCD device is driven by two gate driving ICs and one source driving IC, since the LCD device includes only one source driving IC, the driving circuit may generate 1200 image data RGB1-RGB400 in response to the first pulse of the source output enable signal SOE and the gate driving signal G1 at first, and then generate 1200 image data RGB401-RGB800 in response to the second pulse of the source output enable signal SOE and the gate driving signal G2. Therefore, the source driving signals corresponding to 2400 image data may be generated by the one source driving IC during one horizontal scanning period 1H.

The driving circuit of the LCD device according to example embodiments of the present inventive concept may generate the source output enable signal having a distinct number of pulses in the cascade mode and in the dual gate mode, respectively, inside the driving circuit, and change the output order of the image data by generating the internal horizontal synchronization signal Hsync_INT in response to the source output enable signal. Therefore, the LCD device according to example embodiments of the present inventive concept may operate both in the cascade mode and in the dual gate mode using the source driving IC of the same structure.

The source driving circuit of the LCD device according to example embodiments of the present inventive concept may use the same source driving IC both in the LCD device operating in the cascade mode and in the LCD device operating in the dual gate mode. Therefore, when example embodiments of the present inventive concept are used for generating a number of image data, the problem of increased chip size for generating the same number of image in the conventional dual gate mode, resulted from the increased sizes of the shift register, the data register and a routing circuit included in the source driving circuit, may be resolved or reduced.

In the above, the driving circuit including one gate driving IC and two source driving ICs and operating in the cascade mode, and the driving circuit including one source driving IC and two gate driving ICs and operating in the dual gate mode are described. However, example embodiments of the present inventive concept may be used in the driving circuit including any number of gate driving ICs and any number of source driving ICs.

In the above, the driving circuit and the LCD device including the driving circuit are described. However, example embodiments of the present inventive concept may be used in the general display device, such as a plasma display panel (PDP), as well as the LCD device.

Example embodiments of the present inventive concept may be used in the driving circuit and the display device including the driving circuit, and, in particular, may be used in the driving circuit of the middle or small size LCD device.

The foregoing is illustrative of example embodiments of present inventive concepts and is not to be construed as limiting thereof. Although a few example embodiments have been described, those skilled in the art will readily appreciate that many modifications are possible in the example embodiments without materially departing from the novel teachings and advantages of example embodiments of present inventive concepts. Accordingly, all such modifications are intended to be included within the scope of example embodiments of present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device, comprising:

a driving-circuit, configured to generate a source output enable signal having at least one pulse during one horizontal scanning period in response to a mode signal, a number of pulses of the source output enable signal during the one horizontal scanning period being based on whether the display device is operating in a dual gate mode or a cascade mode, configured to generate a source driving signal by latching a first image data in response to the source output enable signal, configured to generate an internal horizontal synchronization signal in response to the source output enable signal, and configured to generate a gate driving signal in response to the internal horizontal synchronization signal; and a panel configured to display the first image data in response to the gate driving signal and the source driving signal.

2. The display device of claim 1, wherein the driving circuit is configured to drive the panel in one of the cascade mode and the dual gate mode based on the mode signal.

3. The display device of claim 2, wherein the driving circuit further includes a plurality of source driving circuits, where one of the plurality of source driving circuits is configured to operate as a master and a remainder of the plurality of source driving circuits are configured to operate as a slave when the display device operates in the cascade mode.

4. The display device of claim 2, wherein the driving circuit is configured to generate at least two gate driving signals during the one horizontal scanning period when the display device operates in the dual gate mode.

5. The display device of claim 4, wherein the driving circuit is configured to generate the source output enable signal to have two or more pulses during the one horizontal scanning period when the display device operates in the dual gate mode.

6. The display device of claim 2, wherein the driving circuit is configured to generate the source output enable signal to have two or more pulses during the one horizontal scanning period when the display device operates in the dual gate mode.

7. The display device of claim 1, wherein the driving circuit further includes: a control circuit, configured to generate the first image data by processing an input image data, configured to generate the source output enable signal to have the at least one pulse during the one horizontal scanning period in response to the mode signal, and configured to generate the internal horizontal synchronization signal in response to the source output enable signal;

a source driving circuit configured to generate the source driving signal based on a grayscale voltage, the first image data and the source output enable signal; and a gate driving circuit configured to generate the gate driving signal based on the internal horizontal synchronization signal.

8. The display device of claim 7, wherein the control circuit is disposed in the source driving circuit.

9. The display device of claim 7, wherein the source driving circuit includes:

a shift register configured to generate a sampling signal by shifting a source sampling clock signal;

a data register configured to generate the first image data in synchronization with a first clock signal; and a data latch circuit configured to sample and latch the first image data in response to the sampling signal, and configured to output the first image data when the source output enable signal is activated.

10. The display device of claim 9, wherein the source driving circuit further includes: a digital-to-analog converter configured to generate an analog signal corresponding to the first image data received from the data latch circuit using the grayscale voltage; and an output buffer configured to generate the source driving signal by buffering the analog signal.

11. The display device of claim 7, wherein the driving circuit further includes: a grayscale voltage generating circuit configured to generate the grayscale voltages related to a brightness of the panel.

12. The display device of claim 1, wherein the at least one pulse includes a number of pulses, and the driving circuit is configured to change the number of pulses according to the mode signal.

13. A driving circuit of a display device, comprising:

a control circuit, configured to generate a first image data by processing an input image data, configured to generate a source output enable signal having at least one pulse during one horizontal scanning period in response to a mode signal, and configured to generate an internal horizontal synchronization signal in response to the source output enable signal, a number of pulses of the source output enable signal during the one horizontal scanning period being based on whether the display device is operating in a dual gate mode or a cascade mode;

one or more source driving circuits configured to generate a source driving signal based on a grayscale voltage, the first image data and the source output enable signal; and a gate driving circuit configured to generate a gate driving signal based on the internal horizontal synchronization signal.

14. The driving circuit of the display device of claim 13, wherein the one or more source driving circuits include:

a shift register configured to generate a sampling signal by shifting a source sampling clock signal;

a data register configured to generate the first image data in synchronization with a first clock signal; and a data latch circuit configured to sample and latch the first image data in response to the sampling signal, and configured to output the first image data when the source output enable signal is activated.

15. The driving circuit of the display device of claim 14, wherein the one or more source driving circuits further include:

a digital-to-analog converter configured to generate an analog signal corresponding to the first image data received from the data latch circuit using the grayscale voltage; and an output buffer configured to generate the source driving signal by buffering the analog signal.

16. The driving circuit of the display device of claim 13, wherein the control circuit is disposed in the one or more source driving circuits.

17. The driving circuit of the display device of claim 13, wherein the driving circuit is configured to drive the display device in one of the cascade mode and the dual gate mode based on the mode signal.

18. The driving circuit of the display device of claim 17, wherein the one or more source driving circuits include a plurality of source driving circuits, where one of the plurality of source driving circuits is configured to operate as a master and a remainder of the plurality of source driving circuits are configured to operate as a slave when the display device operates in the cascade mode.

19. The driving circuit of the display device of claim 17, wherein the gate driving circuit is configured to generate at least two gate driving signals during the one horizontal scanning period when the display device operates in the dual gate mode.

20. The driving circuit of the display device of claim 19, wherein the control circuit is configured to generate the source output enable signal to have two or more pulses during the one horizontal scanning period when the display device operates in the dual gate mode.

* * * * *